US008892708B2

(12) United States Patent
Merrill et al.

(10) Patent No.: US 8,892,708 B2
(45) Date of Patent: Nov. 18, 2014

(54) PLACEMENT OF SERVICE DELIVERY LOCATIONS OF A DISTRIBUTED COMPUTING SERVICE BASED ON LOGICAL TOPOLOGY

(75) Inventors: Joshua Merrill, Parker, CO (US); Huida Dai, Cupertino, CA (US); Jiang Zhu, Sunnyvale, CA (US); Sukhdev Kapur, Saratoga, CA (US); Subrata Banerjee, Los Altos, CA (US); Danny Elder, San Diego, CA (US); Ashok Ganesan, San Jose, CA (US); Shujin Zhang, Palo Alto, CA (US); Jan Medved, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 561 days.

(21) Appl. No.: 13/180,331

(22) Filed: Jul. 11, 2011

(65) Prior Publication Data

US 2013/0018999 A1 Jan. 17, 2013

(51) Int. Cl.
*G06F 15/173* (2006.01)
*H04L 12/24* (2006.01)
*H04L 29/08* (2006.01)

(52) U.S. Cl.
CPC .............. *H04L 41/5096* (2013.01); *H04L 41/12* (2013.01); *H04L 41/5041* (2013.01); *H04L 67/10* (2013.01)
USPC ............................. 709/223; 709/224; 709/226

(58) Field of Classification Search
CPC . H04L 41/12; H04L 41/5041; H04L 41/5096; H04L 67/10
USPC .......................................... 709/223, 224, 226
See application file for complete search history.

(56) References Cited

U.S. PATENT DOCUMENTS

| | | | |
|---|---|---|---|
| 6,311,310 B1 * | 10/2001 | Bernstein et al. ............. | 716/113 |
| 6,959,318 B1 * | 10/2005 | Tso ................................ | 709/203 |
| 7,499,998 B2 | 3/2009 | Toebes et al. | |
| 7,584,298 B2 * | 9/2009 | Klinker et al. ................ | 709/238 |
| 7,634,566 B2 | 12/2009 | Turner et al. | |
| 7,747,720 B2 | 6/2010 | Toebes et al. | |
| 7,987,228 B2 * | 7/2011 | McKeown et al. ........... | 709/202 |
| 2001/0039640 A1 * | 11/2001 | Bernstein et al. ................ | 716/2 |
| 2002/0083118 A1 * | 6/2002 | Sim ............................... | 709/105 |
| 2003/0061602 A1 * | 3/2003 | Graham et al. ............... | 717/148 |
| 2003/0154266 A1 * | 8/2003 | Bobick et al. ................. | 709/223 |

(Continued)

OTHER PUBLICATIONS

CISCO, "Any Transport over MPLS", [online], Mar. 2002, [retrieved on Feb. 3, 2011]. Retrieved from the Internet: URL: <http://www.cisco.com/warp/public/cc/so/neso/vpn/unvpnst/atomf_ov.pdfs>, pp. 1-7.

(Continued)

*Primary Examiner* — Mohamed Wasel
(74) *Attorney, Agent, or Firm* — Leon R. Turkevich

(57) ABSTRACT

In one embodiment, a method comprises receiving a request for a distributed service, the distributed service offered by a service provider via a data communications network having service delivery locations reachable via a prescribed physical topology; identifying the service delivery locations within a prescribed logical topology overlying the prescribed physical topology, the prescribed logical topology segregating the distributed service from other network traffic on the prescribed physical topology; and identifying one or more of the service delivery locations optimized for providing the distributed service to at least one service consumption location in the prescribed logical topology according to a prescribed service level agreement with the service provider.

20 Claims, 8 Drawing Sheets

(56) References Cited

U.S. PATENT DOCUMENTS

| | | | |
|---|---|---|---|
| 2004/0049639 A1* | 3/2004 | So et al. | 711/137 |
| 2005/0060406 A1 | 3/2005 | Zhang et al. | |
| 2006/0116988 A1* | 6/2006 | Toebes et al. | 707/3 |
| 2006/0212524 A1* | 9/2006 | Wu et al. | 709/206 |
| 2008/0249796 A1* | 10/2008 | Croy et al. | 705/1 |
| 2009/0006431 A1* | 1/2009 | Agrawal et al. | 707/100 |
| 2009/0070556 A1* | 3/2009 | Griswell et al. | 712/207 |
| 2009/0089438 A1* | 4/2009 | Agarwal et al. | 709/228 |
| 2011/0035248 A1 | 2/2011 | Juillard | |
| 2011/0238738 A1* | 9/2011 | Wu et al. | 709/203 |
| 2012/0166310 A1* | 6/2012 | Werklund et al. | 705/26.41 |
| 2012/0317655 A1* | 12/2012 | Zhang et al. | 726/28 |
| 2013/0080626 A1* | 3/2013 | Thireault | 709/224 |
| 2013/0101115 A1* | 4/2013 | Khamkhosy | 380/201 |
| 2013/0204717 A1* | 8/2013 | Bookstaff | 705/14.73 |

OTHER PUBLICATIONS

CISCO, "Cisco Application Visibility and Management Optimization Service", [online], Jun. 2008, [retrieved on Feb. 3, 2011]. Retrieved from the Internet: URL: <http://www.cisco.com/en/US/services/ps2961/ps9851/avm_datasheet.pdf>, pp. 1-4.

"MPLS/Tag Switching", [online], Oct. 15, 2010, [retrieved on Feb. 15, 2011]. Retrieved from the Internet: URL: <http://docwiki.cisco.com/w/index.php?title=MPLS/Tag_Switching&printable=yes>, pp. 1-9.

Cisco IOS MPLS, "Virtual Private LAN Service (VPLS) Technical Deployment Overview", [online], 2004, [retrieved on Feb. 14, 2011]. Retrieved from the Internet: URL: <http://www.cisco.com/application/pdf/en/us/guest/tech/tk891/c1482/ccmigration_09186a00801ed3ea.pdf>, pp. 1-45.

Wikipedia, "Multiprotocol Label Switching", [online], Jan. 27, 2011, [retrieved on Feb. 14, 2011]. Retrieved from the Internet: URL: <http://en.wikipedia.org/w/index.php?title=Multiprotocol_Label_Switching&printable=yes>, pp. 1-8.

Wikipedia, "Virtual Private LAN Service", [online], Jan. 26, 2011, [retrieved on Feb. 15, 2011]. Retrieved from the Internet: URL: <http://en.wikipedia.org/w/index.php?title=Virtual_Private_LAN_Service&printable=yes>, pp. 1-4.

Rosen et al., "Multiprotocol Label Switching Architecture", Network Working Group, Request for Comments: 3031, Jan. 2001, pp. 1-61.

Bonvin et al., "Autonomic SLA-driven Provisioning for Cloud Applications", Cluster, Cloud and Grid Computing (CCGRID), 2011 11th IEEE/ACM International Symposium, IEEE, May 23, 2011, pp. 434-443.

Demchenko et al., "On-Demand Provisioning of Cloud and Grid based Infrastructure Services for Collaborative Projects and Groups", Collaboration Technologies and Systems (CTS), 2011 International Conference, IEEE, May 23, 2011, pp. 134-142.

Gu et al., "QoS-Assured Service Composition in Managed Service Overlay Networks", Proceedings of the 23rd International Conference on Distributed Computing Systems, ICDS 2003, Providence, RI, May 19-22, 2003, pp. 1-8.

Search Report and Written Opinion mailed Oct. 19, 2012, PCT Application No. PCT/US2012/046073, 14 pages.

* cited by examiner

PLACEMENT OF SERVICE DELIVERY LOCATIONS OF A DISTRIBUTED COMPUTING SERVICE BASED ON LOGICAL TOPOLOGY

TECHNICAL FIELD

The present disclosure generally relates to distributed computing services. More particularly, the present disclosure relates to identifying a service delivery location to provide a distributed computing service (such as a cloud computing service) to one or more users at a service consumption location via a physical data network, for example an Internet protocol (IP) based wide area network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing data networks are established by a physical network infrastructure that is organized into a prescribed physical topology. Existing link layer (i.e., OSI layer 2) protocols (e.g., Ethernet, Asynchronous Transfer Mode (ATM), token ring, etc.) are used to establish a local area network using wired or wireless link layer switches, bridges repeaters, etc. Existing network layer (i.e., OSI layer 3) routing protocols such as Internet Protocol (IP) can be used to interconnect local area networks into an autonomous system having one or more network layer routers for interconnecting the local area networks. Such routing protocols also can be used to provide routing information between autonomous systems for formation of a wide area network (WAN). Hence, a prescribed physical topology can be established by link layer protocols and network layer routing protocols overlying the link layer protocols.

Private networks can be established based on applying a prescribed logical topology overlying the prescribed physical topology. The prescribed logical topology enables network traffic utilizing the prescribed logical topology to be segregated from the prescribed physical topology, for example for purposes of privacy, security, or performance.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
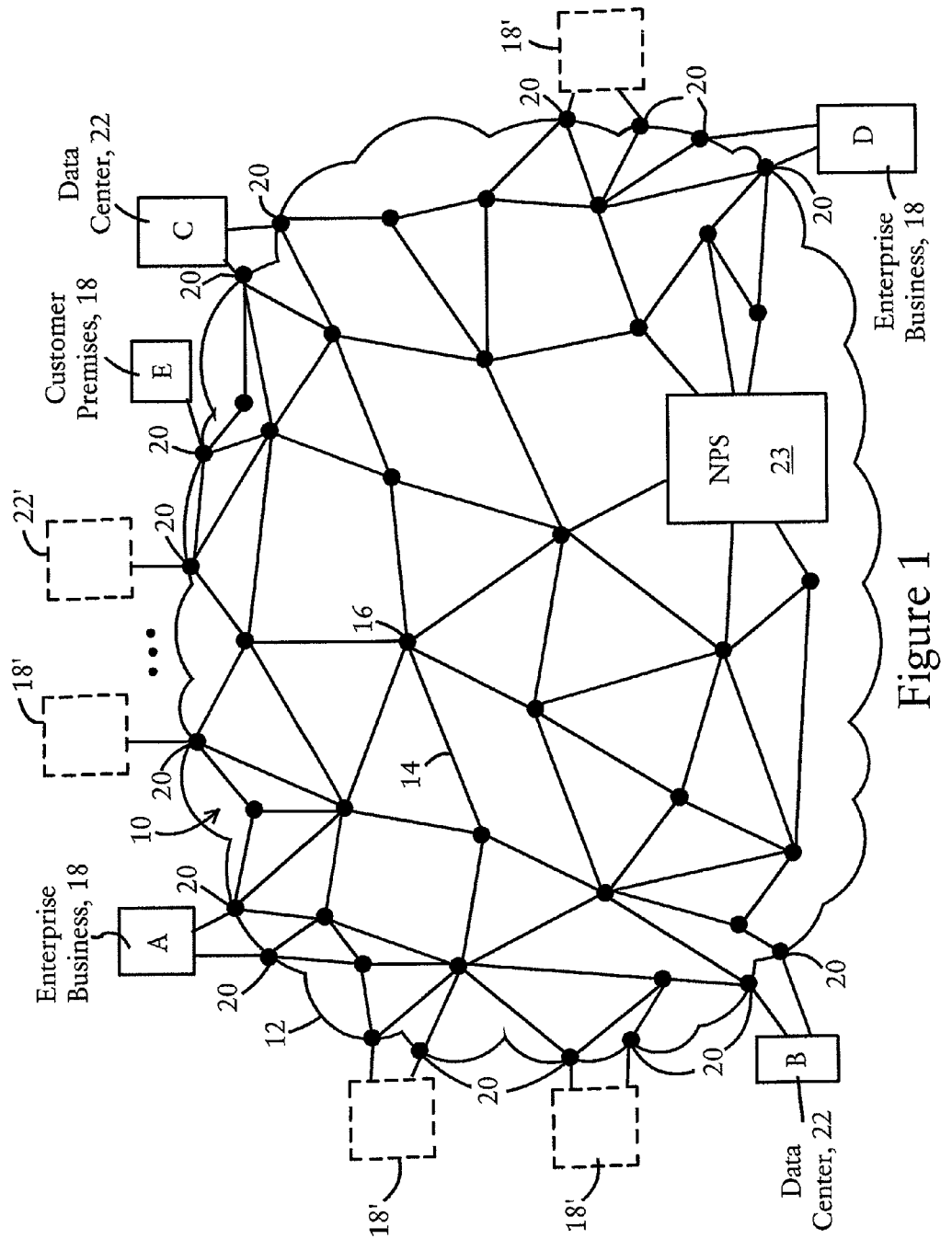
FIG. 1 illustrates an example prescribed physical topology of a network and a network positioning system for providing a distributed service, according to an example embodiment.

In one embodiment, a method comprises receiving a request for a distributed service, the distributed service offered by a service provider via a data communications network having service delivery locations reachable via a prescribed physical topology; identifying the service delivery locations within a prescribed logical topology overlying the prescribed physical topology, the prescribed logical topology segregating the distributed service from other network traffic on the prescribed physical topology; and identifying one or more of the service delivery locations optimized for providing the distributed service to at least one service consumption location in the prescribed logical topology according to a prescribed service level agreement with the service provider.

In another embodiment, an apparatus comprises a network interface circuit, and a processor circuit. The network interface circuit is configured for receiving a request for a distributed service, the distributed service offered by a service provider via a data communications network having service delivery locations reachable via a prescribed physical topology. The processor circuit is configured for identifying the service delivery locations within a prescribed logical topology overlying the prescribed physical topology, the prescribed logical topology segregating the distributed service from other network traffic on the prescribed physical topology. The processor circuit further is configured for generating, for output by the network interface circuit, an identification of one or more of the service delivery locations optimized for providing the distributed service to at least one service consumption location in the prescribed logical topology according to a prescribed service level agreement with the service provider.

DETAILED DESCRIPTION

Particular embodiments enable distributed services such as a "cloud computing service" offered by a service provider to be optimized for delivery to users subscribing to the distributed service according to a prescribed service level agreement between the users and the service provider. The distributed services are optimized for delivery based on providing an identification of one or more service delivery locations in a prescribed logical topology of the network and that are optimized for providing the distributed service to at least one service consumption location accessed by the users. In one embodiment, the identification of the one or more service delivery locations optimized for providing the distributed service to the at least one service consumption location can be generated in the form of an ordered list of the service delivery locations, the ordered list providing a ranking of the service delivery locations optimized for the at least one service consumption point.

Private networks can be established based on applying a prescribed logical topology overlying a prescribed physical topology, for example for providing a virtual private network (VPN) interconnecting multiple users at different physical locations within a single (secure) logical realm. The example embodiments provide an automated mechanism for optimized placement of a distributed service (offered as a cloud computing service) within a prescribed logical topology, eliminating the necessity for manual configuration or manual provisioning of service delivery locations prior to service activation.

FIG. 1 illustrates an example prescribed physical topology 10 of a data communications network 12 deployed by a service provider (e.g., an Internet Service Provider) for providing a distributed service as a cloud computing service, according to an example embodiment. The network 12 includes within its prescribed physical topology 10 numerous physical links 14 and interconnecting nodes 16. The links can be Ethernet links (e.g., 100 Mbit/sec, Gigabit/sec and above), T1 links, ATM links, etc. The interconnecting nodes 16 can be link layer switches, bridges, repeaters, and/or network layer routers configured for executing a prescribed routing protocol. The network layer routers within the network 12 can communicate within a single autonomous system (AS) using a prescribed interior gateway protocol (IGP), for example Open Shortest Path First (OSPF), Intermediate System-to-Intermediate System (IS-IS) protocol, or Routing Information Protocol (RIP). The network layer routers within the network 12 also can communicate across autonomous systems using border gateway protocol (BGP), where Exterior BGP is used for sharing routing information between autonomous systems, and Interior BGP (iBGP) is used to exchange routes within an autonomous system. Hence, the example network 12 can represent one or more autonomous systems establishing a prescribed physical topology according to existing link layer and IP routing protocols.

As illustrated in FIG. 1, the network 12 provides network connectivity to different customer premises 18 via access routers 20 (i.e., edge routers) to provide a physical connection (i.e., link layer and network layer connection) into the network 12. Example customer premises 18 can include a single-family home residence having a cable or DSL modem, a multitenant unit (e.g., an apartment building) having a router and optical modem, an office having its own subscription with the Internet service provider providing access to the network 12, or a multi-office enterprise having multiple access routers 20 for connecting its multi-homed wide area network to the network 12 offered by the Internet service provider. The access routers 20 also provide a physical connection to data centers 22, for example a server farm configured for providing prescribed services to subscribers (e.g., web hosting, video streaming, remote data storage, remote application services, etc.). As illustrated in FIG. 1, additional customer premises 18' or data centers 22' may share the same prescribed physical topology 10. The data centers 22 and 22' may be provided by the service provider of the network 12, or by third-party vendors.

Figure 2A:
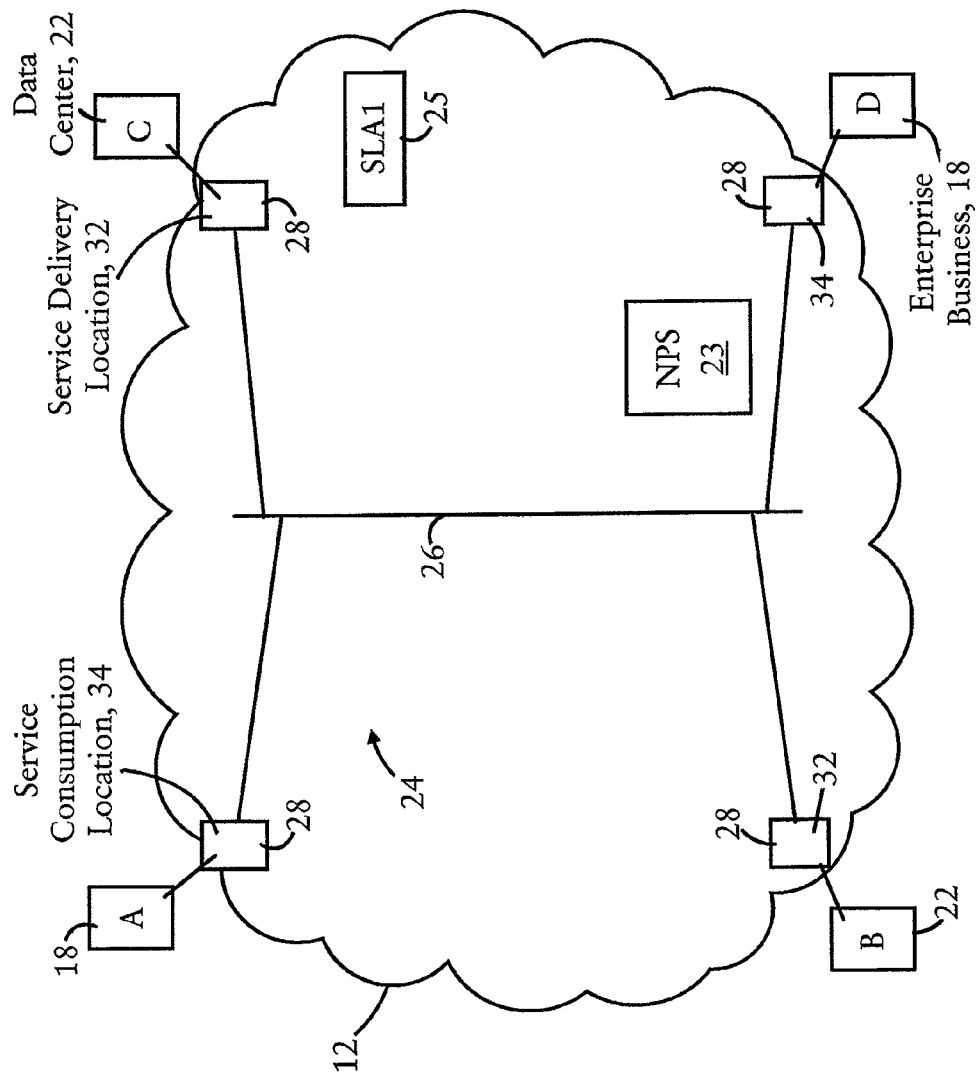
FIGS. 2A and 2B illustrate example logical topologies overlying the prescribed physical topology of FIG. 1, for providing a distributed service according to a prescribed service level agreement between a service provider and subscribers, according to an example embodiment.
Figure 2B:
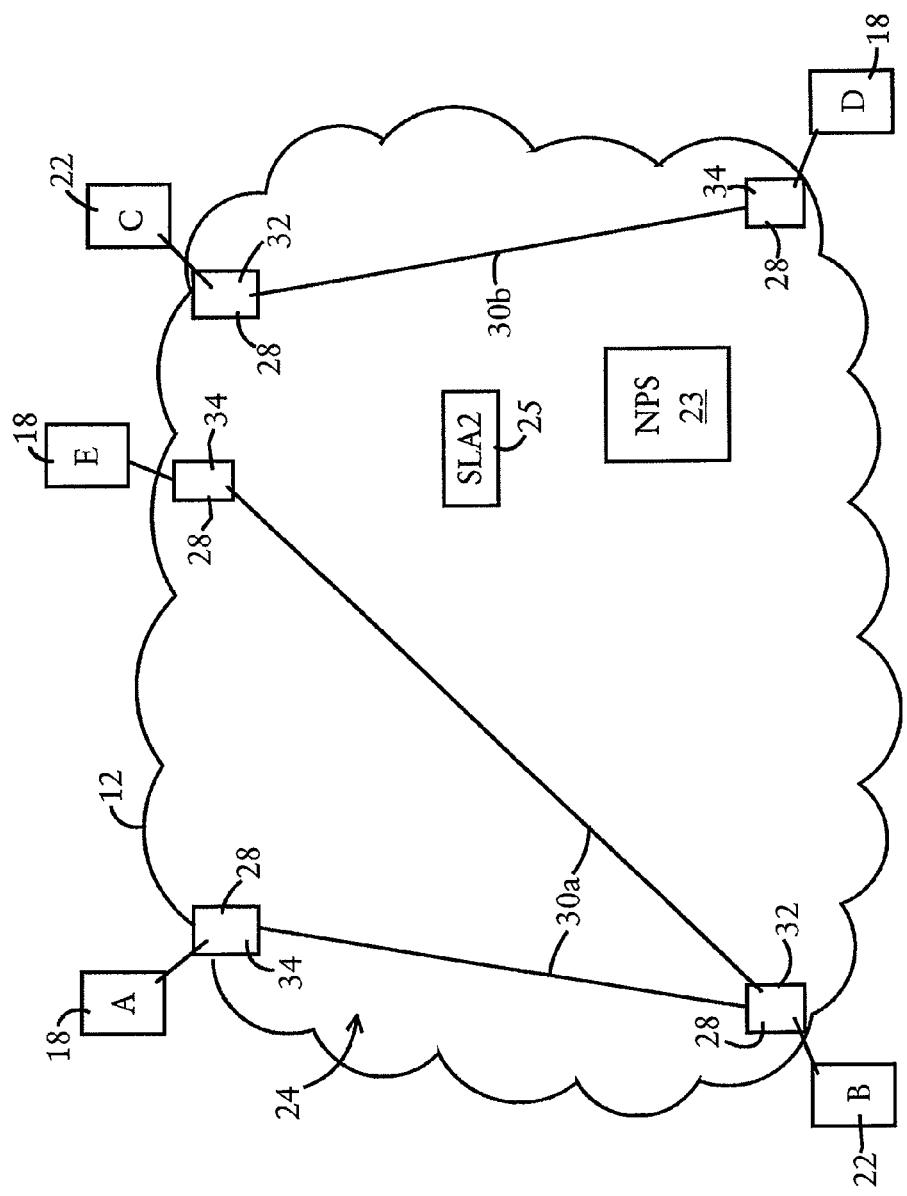

According to an example embodiment, the network 12 includes a network positioning system 23. The network positioning system 23 is configured for obtaining physical network parameters from the prescribed physical topology 10, and logical network parameters from a logical topology 24 overlying the physical network topology 10, illustrated in FIGS. 2A and 2B. As illustrated in FIGS. 2A and 2B, the prescribed logical topology 24 overlying the prescribed physical topology 10 of FIG. 1 establishes a private network for a cloud computing service, for example a link layer-based multipoint layer 2 virtual private network (VPN) service between the service delivery locations 32 and one or more service consumption locations 34 accessible by the subscribers. The prescribed logical topology 24 illustrated in FIGS. 2A and 2B can be established, for example, using BGP bindings, Multiprotocol Label Switching (MPLS) according to RFC 3031, Virtual Private LAN services (VPLS) according to RFC 4761 and RFC 4762, multi-point VPN tunnels, and/or the Any Transport over MPLS (AToM) that is commercially available from Cisco Systems, San Jose Calif. The prescribed logical topology 24 also can be established, for example, using the commercially available Cisco Overlay Transport Virtualization (OTV). Other techniques may be used for establishing the logical topology 24 as illustrated in FIGS. 2A and 2B. Also note that the logical topology 24 can be have a predetermined (e.g., pre-built) topology, or can be created on-demand in response to a customer request.

FIG. 2A illustrates one example logical topology 24. The network positioning system 23 can determine (e.g., discover) that a prescribed service-level agreement (SLA1) 25 authorizes all of the users at the enterprise businesses 18 and all of the data centers 22 to connect via the prescribed logical topology to a single logical link 26, while preventing unauthorized users (e.g., the set of users "E" in FIG. 1) from accessing the logical topology 24. As illustrated in FIGS. 2A and 2B, each entity (e.g., 18, 22) has a corresponding logical endpoint 28 that provides a logical connection into the network 12. FIG. 2B illustrates another example logical topology overlying the prescribed physical topology of the network 12, where the logical topology 24 includes two distinct logical links 30a and 30b, where access to the distinct logical links 30a and 30b can be set, for example, by the service level agreement (SLA2) 25; hence, the set of users "A" and "E" 18 are only permitted by the network positioning system 23 to access the data center "B" via the logical link 30a, and the set of users "C" 18 are only permitted to access the data center "D" via the logical link 30b. Also note that the physical or geographic proximity of a set of users (e.g., "E") to a given destination (e.g., data center "C"), or the number of network hops (as applied in existing distance vector routing protocols) may be deemed irrelevant by the network positioning system 23 within the prescribed logical topology, as illustrated by the requirement that the set of users "E" 18 can only access the data center "B" which is physically and geographically further from the set of users "E" 18 than the data center "C" 22.

The service-level agreement (SLA) 25 can be defined using one or more network-measurable parameters, for example bandwidth, jitter, delay, network resource utilization, congestion avoidance capabilities, etc.

Hence, the prescribed logical topology 24 can be substantially different from the underlying prescribed physical topology 10, enabling the establishment of private networks in the prescribed logical topology 24 that segregate network traffic within the private networks from other network traffic (e.g., between customer premises 18' and data centers 22') in the prescribed physical topology 10. Hence, the prescribed logical topology 24 of FIGS. 2A and 2B, as established by the SLA 25, excludes the customer premises 18' and the data centers 22' from communicating with any of the customer premises 18 or the data centers 22.

Although the deployment of a prescribed logical topology 24 enables private network services for privacy, security, performance, etc., such a logical topology needs to be considered in determining the best location for delivery of a cloud computing service to an end user. In particular, a poor placement of a service delivery location relative to the logical endpoint 28 of a user requesting a cloud computing service can result in reduced performance or significant delay, requiring additional manual configuration prior to service activation. Further, failure to evaluate the logical topology can result in an inaccessible service if deployed at a physical location that is not connected to the logical topology.

Figure 6:
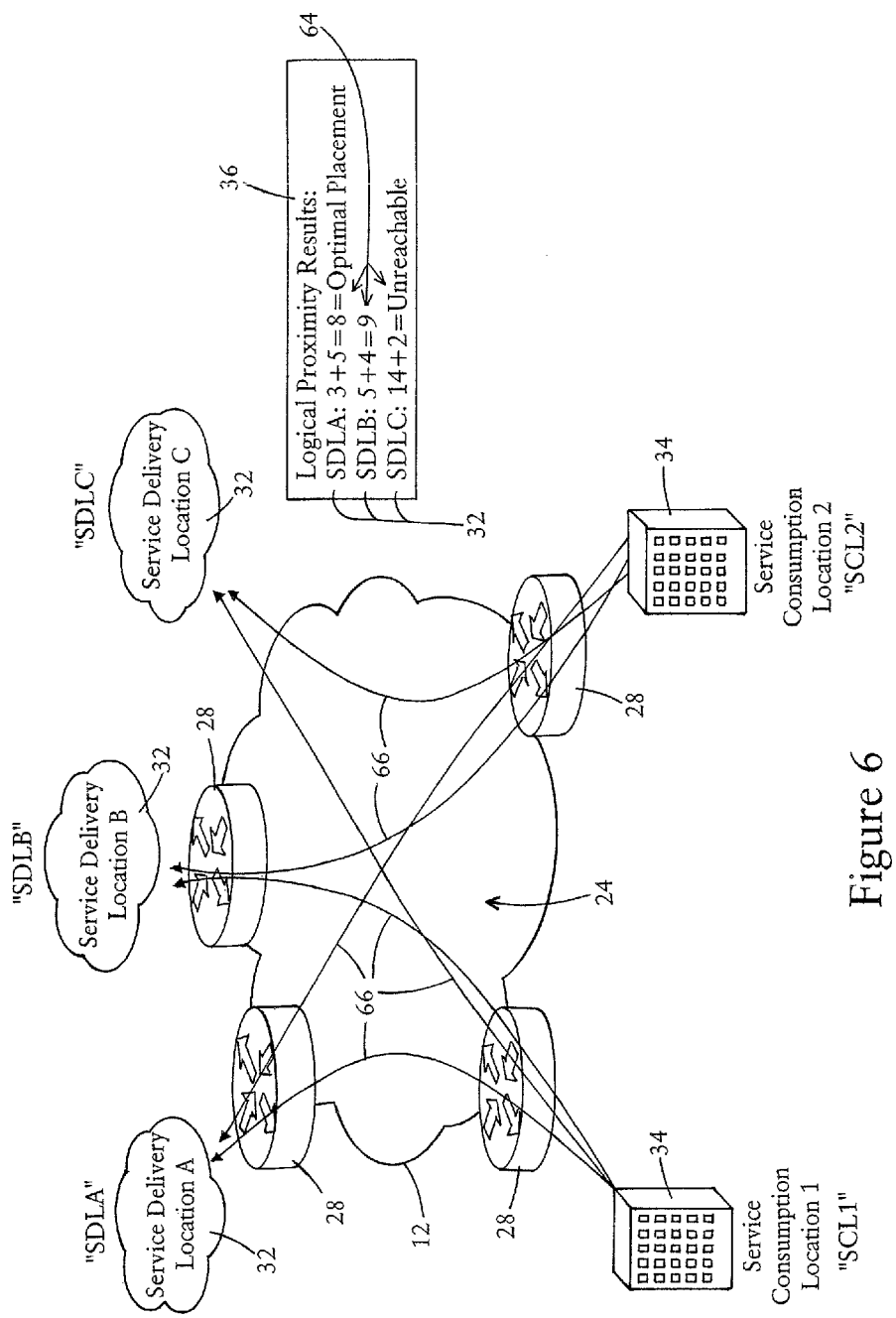
FIG. 6 illustrates an example logical topology of service delivery locations providing a distributed service to at least one service consumption location, according to an example embodiment.

According to an example embodiment, the network positioning system 23 can be configured for correlating between the prescribed physical topology 10 and a prescribed logical topology 24 as established according to a prescribed service-level agreement 25, in order to provide an identification of service delivery locations optimized for providing the distributed service, the identification illustrated in FIG. 6 as an ordered list 36 of the service delivery locations 32. The example ordered list 36 of service delivery locations 32 provides a ranking of the service delivery locations 32 relative to at least one service consumption location 34 (e.g., 28 of the set of users "E" 18) within the prescribed logical topology 24, and according to the prescribed service level agreement 25 between the users and the service provider.

Hence, the users subscribing to a distributed service (e.g., a cloud computing service) according to a prescribed service level agreement 25 (i.e., "subscribers") can access the distributed service based on dynamic generation of an identification 36 of service delivery locations relative to one or more service consumption locations 34 within a prescribed logical topology 24 overlying a prescribed physical topology 10 of a physical data communications network 12.

Figure 3:
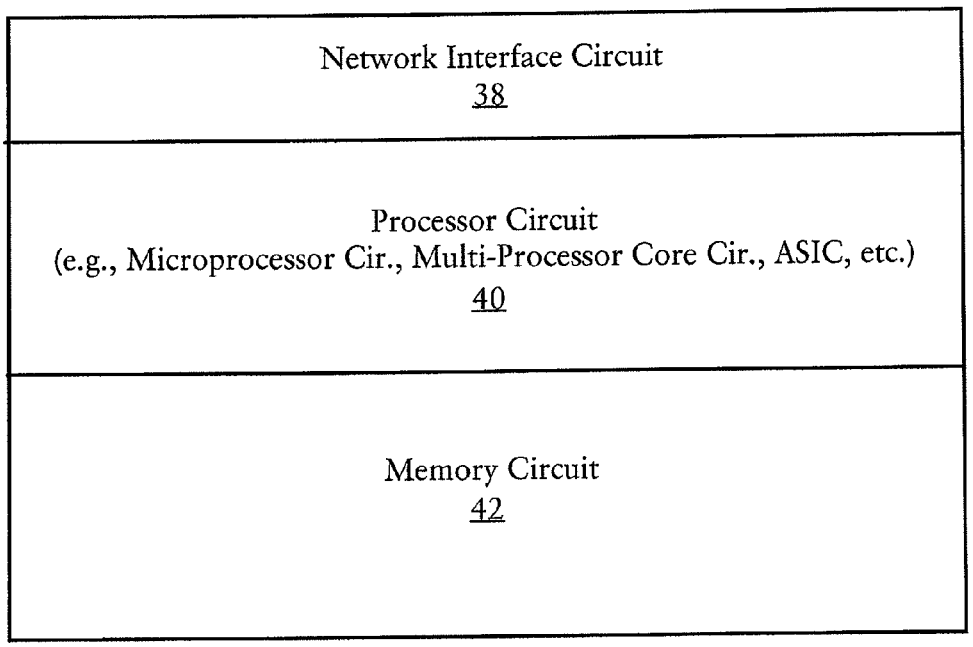
FIG. 3 illustrates an example implementation of the network positioning system of FIG. 1, according to an example embodiment.

FIG. 3 is a diagram illustrating an example network positioning system 23, according to an example embodiment. The network positioning system 23 can be implemented as a single physical machine (i.e., a hardware device) configured for implementing network communications with other physical machines 16 via the network 10. Alternately, the network positioning system 23 can be implemented as multiple physical machines configured for implementing distributed computing based on coordinated communications between the physical machines 16 in the network.

The network positioning system 23 can include a network interface circuit 38, a processor circuit 40, and a memory circuit 42. As described in further detail below, the network interface circuit 38 can be configured for receiving, from any requestor, a request for a distributed service. The request can be in the form of a request for provisioning the distributed service, or a more complex request such as a request for identifying one or more service delivery locations 32 for a distributed service that is offered as a cloud computing service by a service provider via the data communications network 12 having the prescribed physical topology 10. The network interface circuit 30 also can be configured for receiving physical topology parameters from network routers 16 within the network 12, for example IGP bindings received according to OSPF, IS-IS, and/or RIP protocol. The network interface circuit 30 also can be configured for receiving logical topology parameters, for example BGP bindings according to BGP protocol, MPLS label information according to Label Distribution Protocol (LDP), VPLS information according to VPLS protocol, and/or AToM information according to AToM protocol. The AToM system is a commercially-available product from Cisco Systems, San Jose, Calif., that can transport link layer packets over an IP/MPLS backbone. The network interface circuit 30 also can be configured for outputting the identification (e.g., ordered list) 36 of service delivery locations 32 to the requestor.

The processor circuit 40 can be configured for identifying the service delivery locations 32 within the prescribed logical topology 24 and generating the identification (e.g., ordered list) 36 based on ranking the service delivery locations 32 at their respective logical endpoints 28 relative to at least one logical endpoint 28 of at least one service consumption location 34. The memory circuit 42 can be configured for storing any parameters necessary for generation of the identification 36 by the processor circuit 40, including the physical topology parameters and logical topology parameters received by the network interface circuit 30. The memory circuit 42, implemented as one or more non-transitory tangible media, also can be configured for storing logic that is encoded in the memory circuit 42 for execution, for example in the form of executable software.

Any of the disclosed circuits of the network positioning system 23 (including the network interface circuit 38, the memory circuit 42, the processor circuit 40, and their associated components) can be implemented in multiple forms. Example implementations of the disclosed circuits include non-transitory hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 42) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 42 can be implemented, for example, using a non-volatile memory such as a programmable read only memory (PROM), an EPROM, an EEPROM, a Flash Memory, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 42 can be implemented dynamically by the processor circuit 40, for example based on memory address assignment and partitioning executed by the processor circuit 40.

Figure 4:
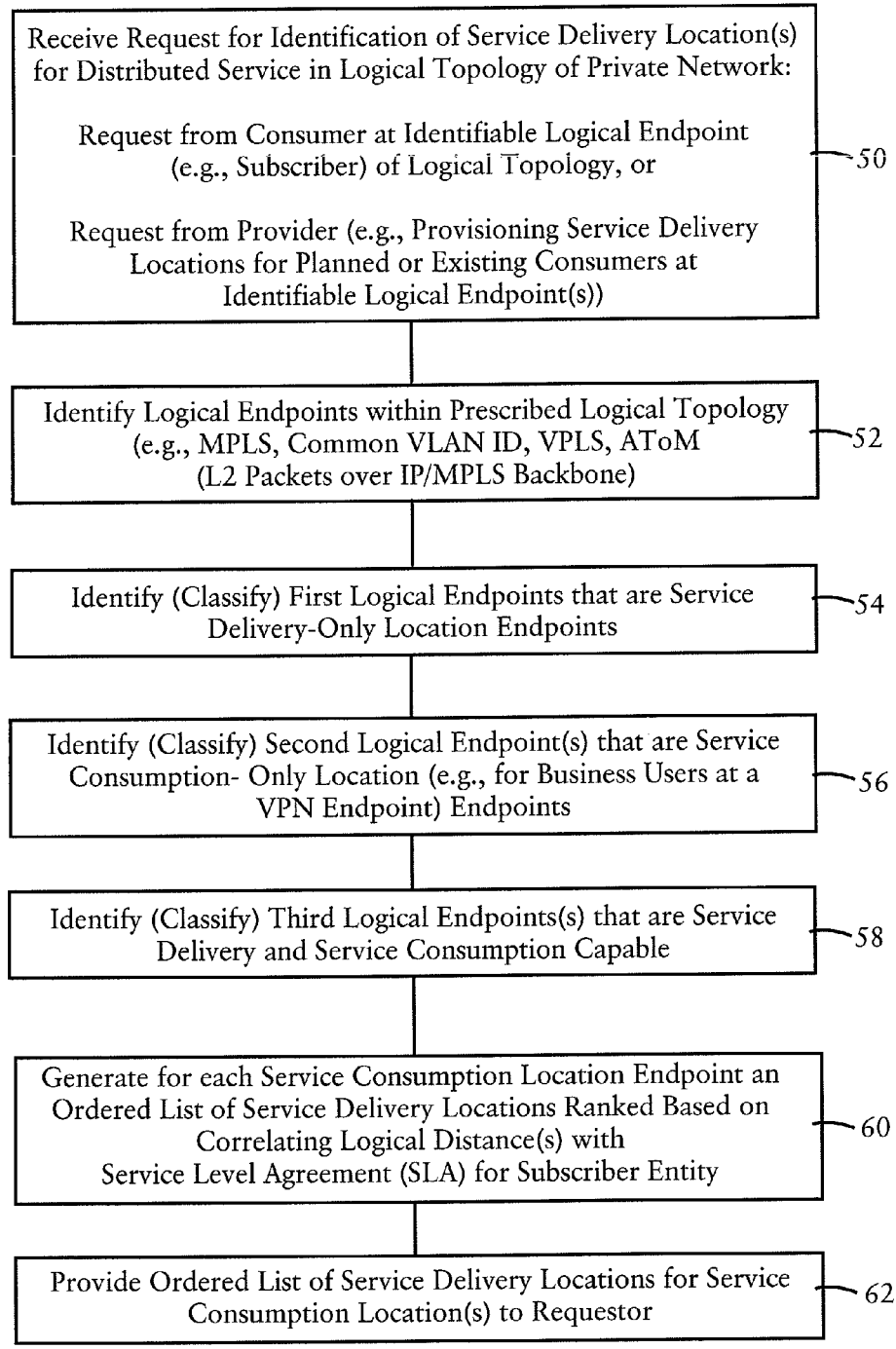
FIG. 4 illustrates an example method by the network positioning system of FIG. 1 in generating and providing an identification of service delivery locations optimized for providing a distributed service to at least one service consumption location in the prescribed logical topology, according to an example embodiment.
Figure 5:
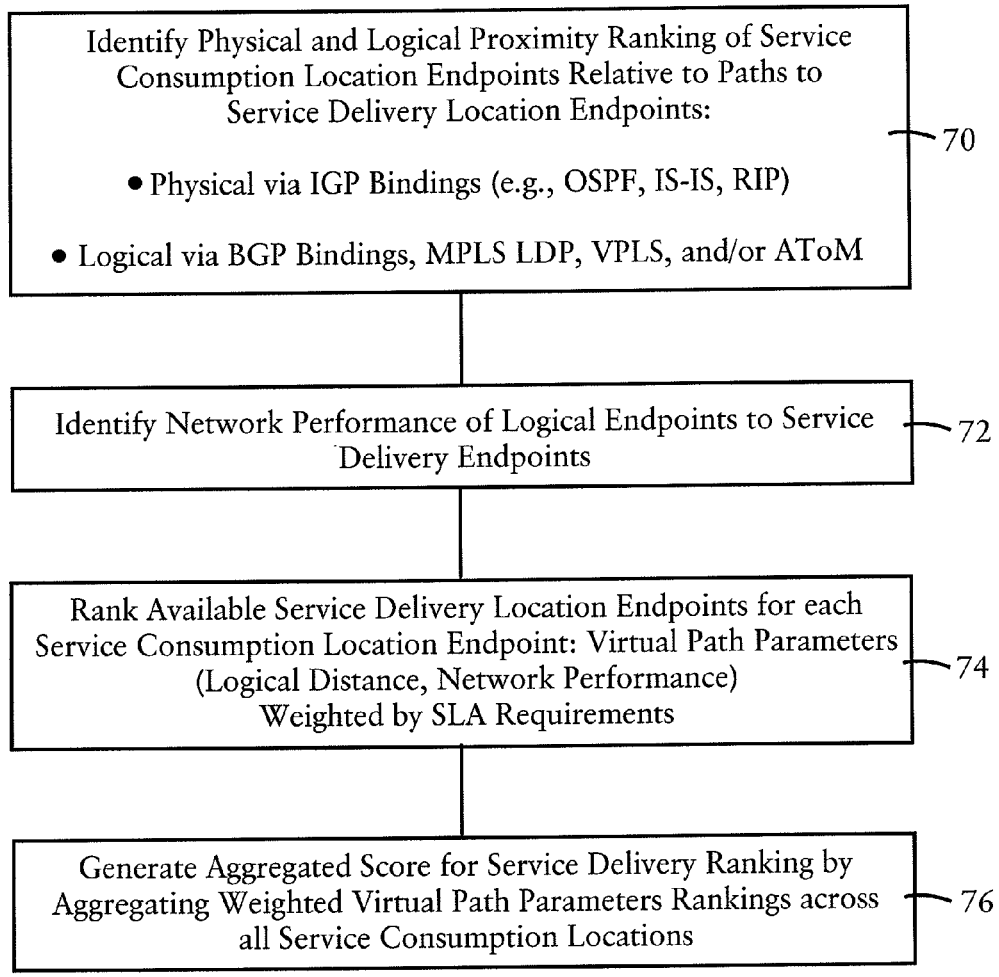
FIG. 5 illustrates an example method by the network positioning system of FIG. 1 of generating the identification of service delivery locations of FIG. 4, according to an example embodiment.

FIG. 4 illustrates an example method by the network positioning system of FIG. 1 in generating and providing an identification of service delivery locations optimized for providing the distributed service to at least one service consumption location in the prescribed logical topology, according to an example embodiment. FIG. 5 illustrates an example method by the network positioning system of FIG. 1 of generating the identification (e.g., ordered list) of service delivery locations of FIG. 4, according to an example embodiment. The steps described in FIGS. 4 and 5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 4, the network interface circuit 38 of the network positioning system 23 receives in step 50 a request a distributed service. The request can be implemented, for example, as a basic request for the distributed service such as a request for provisioning the distributed service; the request also can be implemented as requesting a list of candidate locations, in other words a request for identification of service delivery locations 32 for a distributed service that is offered as a cloud computing service within the logical topology 24 of the private network overlying the prescribed physical topology 10. The request can come from a consumer (e.g., a subscriber) at an identifiable logical endpoint 28 within the logical topology 24, or the request can come from a provider (e.g., an administrator) that is provisioning service delivery locations 32 either for planned future customers or existing customers at identifiable logical endpoints 28 to be implemented as logical service consumption locations 34. An example of a logical service consumption location 34 can be a VPN server within the network 12 that terminates a VPN tunnel established with a client device or a VPN concentrator at the client premises 18.

The processor circuit 40 can identify the logical endpoints 28 within the prescribed logical topology 24 in step 52 based on the protocol used in the network 12 to establish the logical topology 24. For example, the processor circuit 40 can identify the logical endpoints based on an MPLS label distribution protocol (LDP) implemented within the prescribed logical topology 24, identification of logical endpoints sharing a common VLAN identifier according to VPLS (or identification of the same virtual circuit identifier if LDP is used), control word, virtual circuit label and/or tunnel label for an AToM based logical topology. Alternately, logical endpoints can be determined from BGP bindings that can be analyzed to identify BGP peers having created an adjacency; OSPF data also can be analyzed to identify logical endpoints where OSPF areas need to be traversed.

The processor circuit 40 can identify (i.e., classify) from among the logical endpoints 28 a first set of logical endpoints for placement of the service delivery locations 32 in step 54, for example as service delivery-only endpoints such as data centers that do not have any clients that would consume services. The processor circuit 40 also can identify (i.e. classify) from among the logical endpoints 28 a second set of logical endpoints in step 56 for placement of service consumption locations 34, for example as service consumption-only endpoints such as endpoints for customer premises that offer no delivery of any of the cloud computing services. Optionally, the processor circuit 40 also can identify (i.e. classify) from among the logical endpoints 28 a third set of logical endpoints in step 58 that can be identified for placement of either a service delivery location 32 and/or a service consumption location 34, for example an endpoint for an enterprise that includes both multiple users and a data center co-located with the users.

As described in further detail below with respect FIG. 5, the processor circuit 40 can generate in step 60, for each logical service consumption location 34, an identification (e.g., an ordered list) 36 of service delivery locations 32 optimized for providing the distributed service to the logical service consumption location. The service delivery locations 32 can be ranked in the example ordered list 36 based on correlating a "logical distance" between the service delivery location 32 and the service consumption location 34, with the service-level agreement 25 to be applied for establishment of the logical topology 24. In other words, the processor circuit 40 evaluates, for each logical path 66 (FIG. 6) between a service consumption location 34 and a corresponding service delivery location 32, relevant virtual path parameters such as logical distance and network performance, weighted by the requirements specified in the service-level agreement (SLA). The processor circuit 40 provides in step 62 the identification (e.g., ordered list) 36 of service delivery locations 32 that identifies the service delivery locations optimized for providing the distributed service, for example in the form of an ordered list 36 providing a ranking of the service delivery locations relative to one or more service consumption locations 34. As described below with respect to FIG. 5 and FIG. 7, the identification (e.g., ordered list) 36 can be aggregated for multiple service consumption locations 34. The identification (e.g., ordered list) 36 can be output by the network interface circuit 38 to the requestor.

FIG. 5 illustrates in further detail the generation of an identification (e.g., ordered list) 36 of service delivery locations optimized for providing the distributed service, based on aggregated scores 64 (illustrated in FIGS. 6 and 7) representing a relative optimal placement of the service delivery locations 32 across the service consumption locations 34, according to an example embodiment.

The processor circuit 40 identifies in step 70 the physical and logical proximity rankings of the logical service consumption location endpoints 34 relative to the physical and logical paths to the logical service delivery location endpoints 32. For example, the physical topology rankings can be obtained by the processor circuit 40 based on parameters established by IGP-based routing protocols, for example IGP bindings, OSPF parameters, IS-IS parameters, RIP parameters, etc, in order to identify the physical proximity of the logical endpoints 28 based on the physical topology of the network via point-to-point and point to multipoint calculations with respect to the logical endpoints 28; the logical topology rankings can be obtained by the processor circuit 40 for example based on BGP bindings, the parameters obtained based on MPLS label distribution protocol (LDP), VPLS parameters, and/or AToM parameters, in order to identify the logical proximity of the logical endpoints 28 based on the logical topology 24 (e.g., customer VPN topology and connectivity via point-to-point and point to multipoint calculations). The processor circuit 40 identifies in step 72 the network performance parameters to identify the logical path performance for each logical path 66 between the logical endpoints, namely between each service consumption location 34 and each service delivery location 32.

The processor circuit 40 correlates in step 74 the physical proximity/distance results between each of the logical endpoints 28, with the virtual path parameters between each of the logical endpoints 28, weighted by the SLA requirements in order to rank the available service delivery location endpoints 32 for each service consumption location endpoint 34: the virtual path parameters include the logical proximity/distance results between each of the logical endpoints 28, and the network performance based logical path performance between each of the logical endpoints 28.

Hence, the processor circuit 40 can correlate, for each logical path 66 (FIG. 7) between a service delivery location 32 and a service consumption location 34, physical proximity/distance rankings (e.g., geographic or network distance by hop), virtual path parameters (e.g., logical proximity/distance rankings (e.g., number of BGP domains traversed, number of OSPF areas traversed, etc.)), and network performance (e.g., bandwidth capacity, ability to support prescribed quality of service guarantees, packet drop rate, etc.), to identify the best logical paths 66 between a service delivery location 32 and a service consumption location 34. Each of the parameters for each logical path 66 are weighted based on the relevant service-level agreement (SLA) attributes (e.g., bandwidth, jitter, delay, etc.) in order to generate the weighted virtual path parameters 68 (FIG. 7) that logically quantify the performance of each path 66 between a service delivery location 32 and a service consumption location 34. As described previously, the SLA attributes 25 are used to calculate the logical topology 24.

Figure 7:
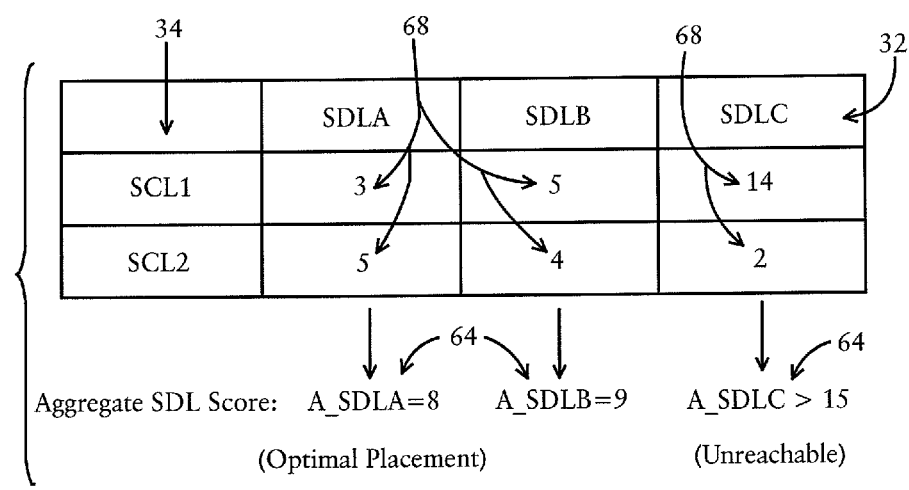
FIG. 7 illustrates an example aggregation of weighted virtual path parameters for generation of an aggregated score representing a relative optimal placement of a service delivery locations relative to multiple service consumption locations, according to an example embodiment.

The weighted virtual path parameters 68 are aggregated by the processor circuit 40 in step 76 for each service delivery location 32 across all of the service consumption locations 34, resulting in an aggregated score 64 for each service delivery location 32 relative to all the service consumption locations 34. Hence, as illustrated in FIGS. 6 and 7, the service delivery location (SDL) "A" (i.e., "SDLA") 32 is identified as having the best overall logical placement 28 for providing distributed services to the service consumption locations SCL1 and SCL2 34 with the lowest weighted virtual path parameter value of "8"; the service delivery location "B" (i.e., "SDLB") 32 is identified as having next best overall logical placement 28 for providing distributed services to the service consumption locations SCL1 and SCL2 34 with the lowest weighted virtual path parameter value of "9"; the service delivery location "C" (i.e., "SDLC") is deemed to have an invalid (i.e., unreachable) logical endpoint because the aggregated score 64 exceeds the prescribed maximum weighted virtual path parameter value of "15".

Hence, the processor circuit 40 can generate, from the aggregated scores 64, the ordered list 36 of service delivery locations 32, providing a ranking of the service delivery locations "SDLA", "SDLB", and "SDLC" for providing distributed computing services in the form of a cloud computing service for the subscribers that the service consumption locations "SCL1" and "SCL2" according to the prescribed service-level agreement between the subscribers and the service provider. The ordered list 36 not only enables optimum placement of the service delivery locations 32, but also can identify (e.g., in the case of "SDLC" 32) whether a physical or logical misconfiguration is present within the prescribed physical topology 10 or the prescribed logical topology 24 according to the SLA 25, enabling corrective measures to be implemented before activating the cloud computing service for the subscribers.

According to the example embodiments, incorporating knowledge of the prescribed logical topology over which the distributed service is to be deployed, in combination with the identification of possible service delivery locations and possible service consumption locations, enables identification of optimal locations of the logical endpoints for suppliers or consumers of the distributed service. Hence, a service provider offering the distributed service (e.g., a cloud computing service) is able to implement a customer's service-level agreement more efficiently with faster deployment and activation of a new service. Although the example embodiments illustrate the distributed service as a cloud computing service, other distributed services can be provided (e.g., distributed storage, distributed collaboration, distributed computing, etc.).

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving a request for a distributed service, the distributed service offered by a service provider via a data communications network having service delivery locations reachable via a prescribed physical topology;
identifying the service delivery locations within a prescribed logical topology overlying the prescribed physical topology, the prescribed logical topology segregating the distributed service from other network traffic on the prescribed physical topology; and
identifying one or more of the service delivery locations optimized for providing the distributed service to at least one service consumption location in the prescribed logical topology according to a prescribed service level agreement with the service provider.

2. The method of claim 1, wherein:
the identifying of the service delivery locations within the prescribed logical topology includes identifying logical endpoints within the prescribed logical topology, and identifying, from among the logical endpoints, first logical endpoints for placement of the service delivery locations, and at least one second logical endpoint for placement of the at least one service consumption location;
the identifying the one or more service delivery locations as optimized for providing the distributed service including generating an ordered list of the service delivery locations based on ranking the service delivery locations at the respective first logical endpoints relative to the at least one second logical endpoint of the at least one service consumption location, based on the prescribed service level agreement.

3. The method of claim 1, wherein the identification of the service delivery locations within the prescribed logical topology is based on any one of:
a label distribution protocol implemented within the prescribed logical topology according to a prescribed multiprotocol label switching (MPLS) protocol,
identification of a common virtual local area network (VLAN) identifier within the prescribed logical topology implementing the prescribed logical topology according to virtual Private LAN service (VPLS), or a prescribed protocol for transporting link layer packets over an Internet Protocol (IP)/MPLS backbone.

4. The method of claim 1, wherein the prescribed logical topology establishes a private network offered by the service provider to multiple users utilizing the distributed service according to the prescribed service level agreement, the prescribed logical topology providing link layer based multipoint layer 2 virtual private network (VPN) service between the service delivery locations and the at least one service consumption location.

5. The method of claim 1, wherein the identifying the one or more service delivery locations as optimized includes providing an ordered list of the service delivery locations, the ordered list providing a ranking of the service delivery locations relative to the at least one service consumption location, the ordered list specifying, for each service delivery location, an aggregated score representing a relative optimal placement of the corresponding service delivery location relative to the at least one service consumption location.

6. The method of claim 5, wherein the aggregated score for each service delivery location is based on aggregating proximity results for a plurality of the service consumption locations, the aggregating of the proximity results based on weighting virtual path parameters between each service delivery location and each service consumption location with service-level agreement attributes, and aggregating the weighted virtual path parameters for each service delivery location across the service consumption locations.

7. The method of claim 1, wherein the distributed service is a cloud computing service.

8. An apparatus comprising:
a network interface circuit configured for receiving a request for a distributed service, the distributed service offered by a service provider via a data communications network having service delivery locations reachable via a prescribed physical topology; and
a processor circuit configured for identifying the service delivery locations within a prescribed logical topology overlying the prescribed physical topology, the prescribed logical topology segregating the distributed service from other network traffic on the prescribed physical topology;
the processor circuit configured for generating, for output by the network interface circuit, an identification of one or more of the service delivery locations optimized for providing the distributed service to at least one service consumption location in the prescribed logical topology according to a prescribed service level agreement with the service provider.

9. The apparatus of claim 8, wherein:
the processor circuit is configured for identifying the service delivery locations within the prescribed logical topology based on identifying logical endpoints within the prescribed logical topology, and identifying, from among the logical endpoints, first logical endpoints for placement of the service delivery locations, and at least one second logical endpoint for placement of the at least one service consumption location;
the processor circuit further configured for generating the identification, of one or more of the service delivery locations optimized for providing the service, as an ordered list of the service delivery locations based on ranking the service delivery locations at the respective first logical endpoints relative to the at least one second logical endpoint of the at least one service consumption location, based on the prescribed service level agreement.

10. The apparatus of claim 8, wherein the processor circuit is configured for identifying the service delivery locations within the prescribed logical topology based on any one of:
a label distribution protocol implemented within the prescribed logical topology according to a prescribed multiprotocol label switching (MPLS) protocol,
identification of a common virtual local area network (VLAN) identifier within the prescribed logical topology implementing the prescribed logical topology according to virtual Private LAN service (VPLS), or
a prescribed protocol for transporting link layer packets over an Internet Protocol (IP)/MPLS backbone.

11. The apparatus of claim 8, wherein the prescribed logical topology establishes a private network offered by the service provider to multiple users utilizing the distributed service according to the prescribed service level agreement, the prescribed logical topology providing link layer based multipoint layer 2 virtual private network (VPN) service between the service delivery locations and the at least one service consumption location.

12. The apparatus of claim 8, wherein the processor circuit is configured for generating the identification as an ordered list of the service delivery locations, the ordered list providing a ranking of the service delivery locations relative to the at least one service consumption location, the ordered list specifying, for each service delivery location, an aggregated score representing a relative optimal placement of the corresponding service delivery location relative to the at least one service consumption location.

13. The apparatus of claim 12, wherein the aggregated score for each service delivery location is based on the processor circuit aggregating proximity results for a plurality of the service consumption locations, the aggregating of the proximity results based on the processor circuit weighting virtual path parameters between each service delivery location and each service consumption location with service-level agreement attributes, and the processor circuit aggregating the weighted virtual path parameters for each service delivery location across the service consumption locations.

14. The apparatus of claim 8, wherein the distributed service is a cloud computing service.

15. Logic encoded in one or more non-transitory tangible media for execution and when executed operable for:
receiving a request for a distributed service, the distributed service offered by a service provider via a data communications network having service delivery locations reachable via a prescribed physical topology;
identifying the service delivery locations within a prescribed logical topology overlying the prescribed physical topology, the prescribed logical topology segregating the distributed service from other network traffic on the prescribed physical topology; and
identifying one or more of the service delivery locations optimized for providing the distributed service to at least one service consumption location in the prescribed logical topology according to a prescribed service level agreement with the service provider.

16. The logic of claim 15, wherein:
the identifying of the service delivery locations within the prescribed logical topology includes identifying logical endpoints within the prescribed logical topology, and identifying, from among the logical endpoints, first logical endpoints for placement of the service delivery locations, and at least one second logical endpoint for placement of the at least one service consumption location;
the identifying the one or more service delivery locations as optimized for providing the distributed service including generating an ordered list of the service delivery locations based on ranking the service delivery locations at the respective first logical endpoints relative to the at least one second logical endpoint of the at least one service consumption location, based on the prescribed service level agreement.

17. The logic of claim 15, wherein the identification of the service delivery locations within the prescribed logical topology is based on any one of:
   a label distribution protocol implemented within the prescribed logical topology according to a prescribed multiprotocol label switching (MPLS) protocol,
   identification of a common virtual local area network (VLAN) identifier within the prescribed logical topology implementing the prescribed logical topology according to virtual Private LAN service (VPLS), or
   a prescribed protocol for transporting link layer packets over an Internet Protocol (IP)/MPLS backbone.

18. The logic of claim 15, wherein the prescribed logical topology establishes a private network offered by the service provider to multiple users utilizing the distributed service according to the prescribed service level agreement, the prescribed logical topology providing link layer based multipoint layer 2 virtual private network (VPN) service between the service delivery locations and the at least one service consumption location.

19. The logic of claim 15, wherein the identifying the one or more service delivery locations as optimized includes providing an ordered list of the service delivery locations, the ordered list providing a ranking of the service delivery locations relative to the at least one service consumption location, the ordered list specifying, for each service delivery location, an aggregated score representing a relative optimal placement of the corresponding service delivery location relative to the at least one service consumption location.

20. The logic of claim 19, wherein the distributed service is a cloud computing service.

* * * * *